(12) United States Patent
Killingbeck

(10) Patent No.: US 8,480,384 B2
(45) Date of Patent: Jul. 9, 2013

(54) QUICK ATTACH AND SAFE RELEASE ARRANGEMENT FOR A PORT OF A WATER PUMP

(75) Inventor: William Stephen Killingbeck, Northern Ireland (GB)

(73) Assignee: Munster Simms Engineering Limited, Dublin (IE)

( * ) Notice: Subject to any disclaimer, the term of this patent is extended or adjusted under 35 U.S.C. 154(b) by 1393 days.

(21) Appl. No.: 11/814,640

(22) PCT Filed: Feb. 7, 2006

(86) PCT No.: PCT/EP2006/001168
§ 371 (c)(1),
(2), (4) Date: Mar. 14, 2008

(87) PCT Pub. No.: WO2006/084697
PCT Pub. Date: Aug. 17, 2006

(65) Prior Publication Data
US 2008/0277935 A1    Nov. 13, 2008

(30) Foreign Application Priority Data
Feb. 8, 2005   (GB) .................................. 0502551.5

(51) Int. Cl.
*F04B 35/04*   (2006.01)
*F16J 15/00*   (2006.01)
*F16L 33/18*   (2006.01)
*F16L 21/02*   (2006.01)
*F16L 19/00*   (2006.01)

(52) U.S. Cl.
USPC ........ 417/423.14; 285/90; 285/360; 285/376; 285/401

(58) Field of Classification Search
USPC ................ 417/423.3, 423.14; 285/33, 81, 90, 285/91, 360, 376, 401, 402
See application file for complete search history.

(56) References Cited

U.S. PATENT DOCUMENTS

| | | | | |
|---|---|---|---|---|
| 242,564 | A | * | 6/1881 | Sholder ............................ 285/81 |
| 437,915 | A | * | 10/1890 | Costigan ....................... 285/401 |
| 808,446 | A | * | 12/1905 | Gill et al. ........................ 285/85 |
| 1,778,739 | A | * | 10/1930 | Wheaton ........................ 285/82 |
| 2,221,284 | A | | 11/1940 | Folsom |
| 2,449,121 | A | * | 9/1948 | Jones ............................... 285/33 |
| 2,919,146 | A | * | 12/1959 | Gill ................................. 285/33 |
| 3,063,377 | A | * | 11/1962 | Stanley et al. .................. 417/83 |
| 3,269,322 | A | * | 8/1966 | Lotspih ..................... 417/423.3 |

(Continued)

FOREIGN PATENT DOCUMENTS

| | | |
|---|---|---|
| EP | 0 987 484 A2 | 3/2000 |
| GB | 2 062 102 A | 5/1981 |

*Primary Examiner* — Peter J Bertheaud
(74) *Attorney, Agent, or Firm* — Tod R. Nissle, P.C.

(57) ABSTRACT

A quick attach and safe release arrangement for a pump of the type in which a pump chamber has at least one chimney and at least one separable port locatable in the at least one chimney. The quick attach and safe release arrangement is provided with a cooperating retaining elements integrally formed with the at least one chimney and integrally formed with the at least one separable port respectively, for retaining the at least one separable port in within the at least one chimney. The at least one separable port and the at least one chimney are rotatable relative to one another and the cooperating retaining elements have a single port release position at a predetermined angular position of the at least one separable port relative to the at least one chimney.

32 Claims, 3 Drawing Sheets

U.S. PATENT DOCUMENTS

| | | | |
|---|---|---|---|
| 3,490,379 A * | 1/1970 | Laing | 417/420 |
| 4,786,085 A | 11/1988 | Sauer et al. | |
| 4,810,174 A * | 3/1989 | Stuckey et al. | 417/423.14 |
| 5,476,367 A | 12/1995 | Zimmermann et al. | |
| 5,571,000 A | 11/1996 | Zimmermann et al. | |
| 6,092,844 A * | 7/2000 | Lee | 285/90 |
| 6,315,334 B1 * | 11/2001 | Garcia | 285/360 |
| 6,464,471 B1 * | 10/2002 | Mathis et al. | 417/350 |
| 2003/0099548 A1 | 5/2003 | Meza et al. | |
| 2004/0009075 A1 | 1/2004 | Meza et al. | |

* cited by examiner

QUICK ATTACH AND SAFE RELEASE ARRANGEMENT FOR A PORT OF A WATER PUMP

CROSS-REFERENCE TO RELATED APPLICATION

This application is a 35 USC 371 application of PCT/EP 2006/001168 filed on Feb. 7, 2006.

BACKGROUND OF THE INVENTION

1. Field of the Invention

The present invention relates to a quick attach and safe release arrangement for a port of a water pump and in particular to a quick attach and safe release arrangement for the ports of a bilge pump of the type having a separable inlet water port and a separable outlet water port.

2. Description of the Prior Art

One particular type of currently available bilge pump has inlet and outlet water ports moulded to the pump chamber of the water pump. It is difficult to gain access to the ports for cleaning or unblocking purposes and in the event that the ports are damaged an entirely new unit is required. An alternative design of water pump has the water inlet port and the water outlet port screwed onto the pump chamber of the unit. This increases the complexity of and time-scale required for assembly and disassembly of the unit. A third design of water pump uses a separate retaining clip for engaging with both chimneys of the water pump chamber and the inlet and outlet ports. These clips are known to break resulting in additional costs associated with repair time and replacement clips.

SUMMARY OF THE INVENTION

It is an object of the present invention to provide a water pump with separate inlet and outlet ports which can be readily removed from the body of the water pump when the pump is out of use and which are secured in a fluid tight manner onto the main body when the water pump is in use.

Accordingly, the present invention provides a quick attach and safe release arrangement for a pump of the type comprising a pump chamber having at least one chimney and at least one separable port locatable in the at least one chimney, the quick attach and safe release arrangement comprising cooperating retaining means integrally formed with the at least one chimney and integrally formed with the at least one separable port for retaining the at least one separable port in situ in the at least one chimney, the at least one separable port and the at least one chimney being rotatable relative to one another and the cooperating retaining means having a single port release position at a predetermined angular position of the port relative to the chimney.

Ideally, the cooperating retaining means is a tongue and a flange arrangement.

Preferably, the flange is carried on the internal surface of the at least one chimney.

Ideally, the or each tongue is disposed on the external surface of the at least one port.

Preferably, the flange has at least one opening to allow the at least one tongue to pass there through in the port release position.

Ideally, the or each chimney has a chimney wall with at least one longitudinal slot extending through the free edge of the chimney wall and at least partially along the chimney wall.

Preferably, the or each chimney wall has a plurality of longitudinal slots.

Ideally, the plurality of longitudinal slots divide the or each chimney wall of the or each chimney into a plurality of teeth.

Ideally, the flange is disposed on the internal surface of the teeth at or about the free ends of the teeth.

The slots allow the ports to be press-fitted into the or each chimney without requiring the person assembling the water pump to have to align the or each tongue with the or each opening.

Preferably, two tongues are disposed on the at least one port at non-diametrically opposed locations.

Ideally, the flange has two non-diametrically opposed openings which align with the two non-diametrically opposed tongues in the port release position.

In a second embodiment, the cooperating retaining means is provided by a tongue and a groove arrangement.

Preferably, the pump is of the type comprising a pump chamber having a pair of chimneys and an inlet port and an outlet port locatable in the pair of chimneys, the cooperating retaining means being integrally formed on both chimneys and on both the inlet port and the outlet port.

Ideally, the cooperating retaining means is integrally formed on the internal surface of both chimneys and on the external surface of both the inlet port and the outlet port.

Preferably, the pump is a water pump.

Advantageously, the port release position is not attainable when the inlet port and the outlet port are connected to hoses in use.

Advantageously, the one or more openings in each flange defines the one port release position for each port allowing the inlet port and the outlet port to be removed from the chimneys when the hoses have been disconnected.

Essentially, the length of the or each tongue is less than the length of the or each opening in the flange.

It will of course be appreciated that any cooperating retaining means suitable to allow quick-release of the ports from the or each chimney at a single port release position can be used with the present invention. It will also be appreciated that the retaining flange or groove could be provided on the external surface of the ports as opposed to on the internal surface of the or each chimney with one or a pair of tongues or other engagement means located on the internal surface of the or each chimney.

Ideally, the or each port is an elbow-section.

Preferably, the elbow section has a chimney engaging end carrying a leading edge for forming a fluid tight seal within a cavity of the pump chamber.

Ideally, the chimney engaging end of the port has a pair of tongues protruding laterally from the external surface of the chimney engaging end.

Preferably, the internal surface of teeth defined by the longitudinal slots have a flange protruding radially inwardly at or about the free ends of the teeth.

Ideally, two of the teeth which are not diametrically opposed have a central portion of the flange removed defining an opening. These openings in combination with the tongues determine the angle of rotation of the port which is required to achieve the one port release position. The one port release position is achieved when the two non-diametrically opposed tongues are aligned with the two non-diametrically opposed openings. In the event that three or more tongues are used together with three or more openings, the tongues and openings are spaced so that they align at only one angle of rotation of the port relative to the chimney to prevent multiple port release positions.

Ideally, the port can be positioned at any angular displacement relative to the chimney during press-fitting of the port together with the chimney of the pump chamber when the chimney engaging end has been coaxially aligned with the chimney.

BRIEF DESCRIPTION OF THE DRAWINGS

The present invention will now be described with reference to the accompanying drawings which show by way of example only one embodiment of a quick attach and safe release arrangement for a port of a water pump in accordance with the invention. In the drawings:—

DESCRIPTION OF THE PREFERRED EMBODIMENTS

Figure 1:
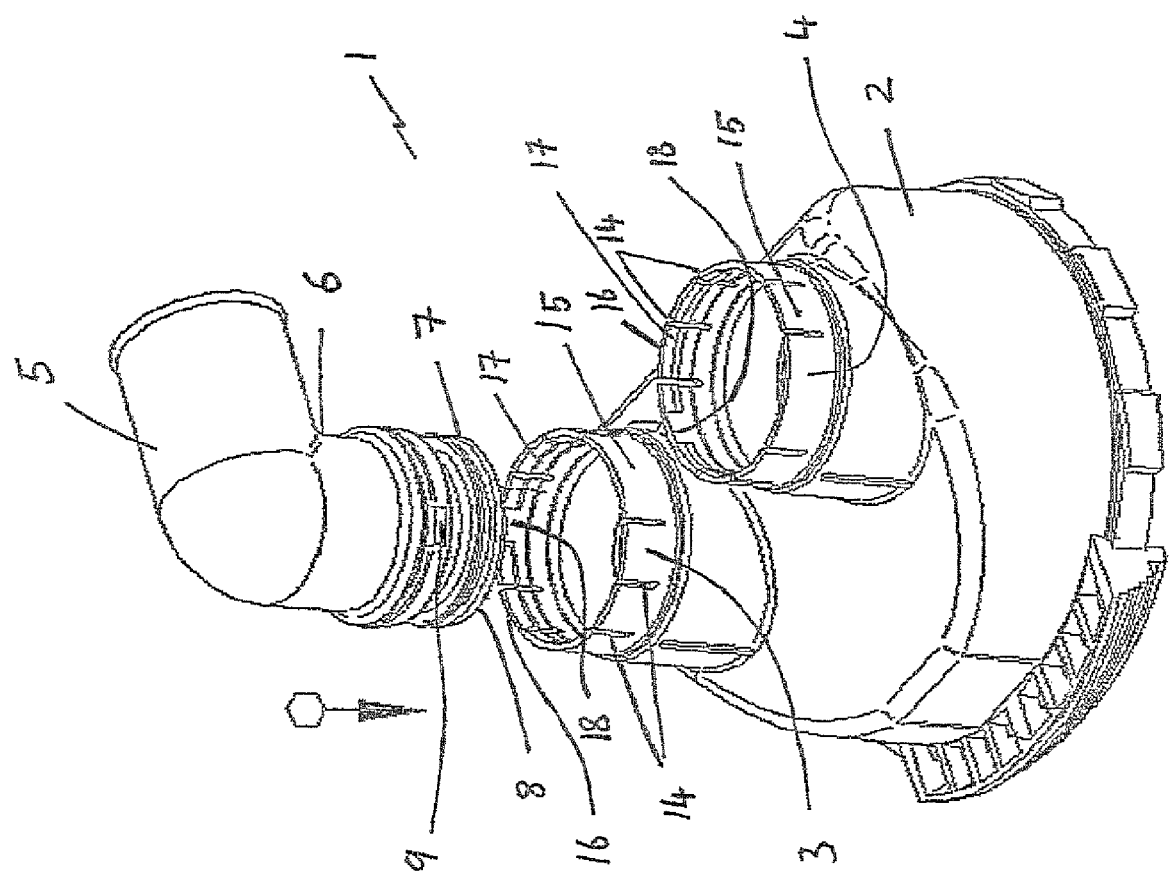
FIG. 1 is a perspective exploded view of a water pump chamber and a water inlet/outlet port embodying the invention.

Referring to the drawings and initially to FIG. 1 there is shown a water pump indicated generally by the reference numeral 1 comprising a pump chamber 2 having a pair of chimneys 3, 4 protruding from the pump chamber 2. The water pump 1 has a separable water inlet port and a separable water outlet port, (one such port 5 being shown) it being irrelevant whether port 5 is the water inlet port or the water outlet port.

The port 5 is an elbow-section 6 having a chimney engaging end 7 carrying a leading edge 8 for forming a fluid tight seal within the cavity of the pump chamber 2.

The chimney engaging end 7 of the port 5 has a pair of tongues 9 (one of which is shown) protruding laterally from the external surface of the chimney engaging end 7. The tongues 9 are located at positions around the circumference of the external surface of the chimney engaging end 7 which are not diametrically opposed. This prevents the ports 5 having two port release positions which is undesirable in the present invention.

The chimneys 3,4 have a number of longitudinal slots 14 defined in their walls 15. The internal surface of teeth 16 defined by the longitudinal slots 14 have a flange 17 protruding radially inwardly at or about the free ends of the teeth 16. Two of the teeth 16 which are not diametrically opposed have a central portion (although it will be appreciated that it is not necessarily the central portion) of the flange 17 removed defining an opening 18. These openings 18 in combination with the tongues 9 determine the angle of rotation of the port 5 which is required to achieve the one port release position. The one port release position is achieved when the two non-diametrically opposed tongues 9 are aligned with the two non-diametrically opposed openings 18. In the event that three or more tongues 9 are used together with three or more openings 18, the tongues 9 and openings 18 are spaced so that they align at only one angle of rotation of the port 5 to prevent multiple port release positions.

FIG. 1 shows that the port 5 can be positioned at any angular displacement relative to the chimneys 3, 4 during press-fitting of the port 5 together with the chimney 3 of the pump chamber 2 when the chimney engaging end 7 has been coaxially aligned with either chimney 3, 4.

Figure 2:
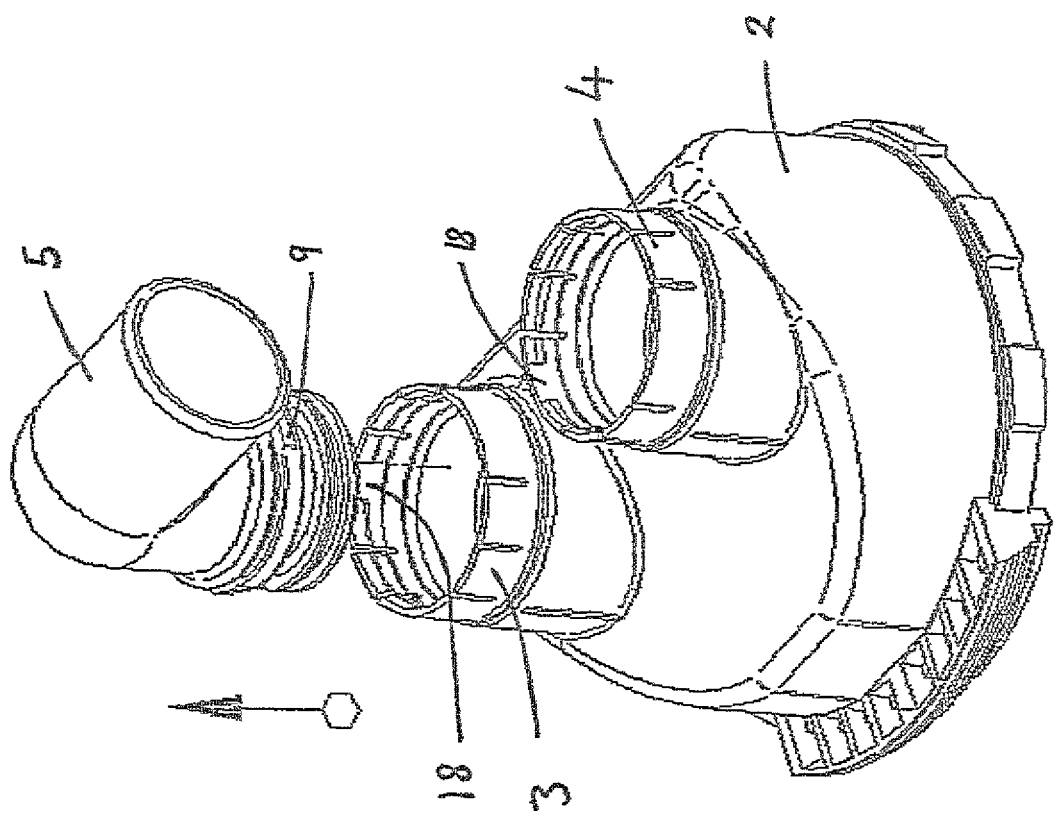
FIG. 2 is a perspective exploded view of a water pump chamber and a water inlet/outlet port embodying the invention.

FIG. 2 shows that the tongues 9 (one of which is shown) must be aligned with the openings 18 (one of which is shown) to allow the port 5 to be removed. Clearly if both ports 5 are coupled to the pump chamber 2 and hoses are connected to both ports 5, the port release positions shown in the drawings can never be attained by either port 5 because the hoses will prevent rotation of the port 5. If movement of the hoses is possible then the hoses will interfere with each other preventing the port release position being attained during use.

Figure 3:
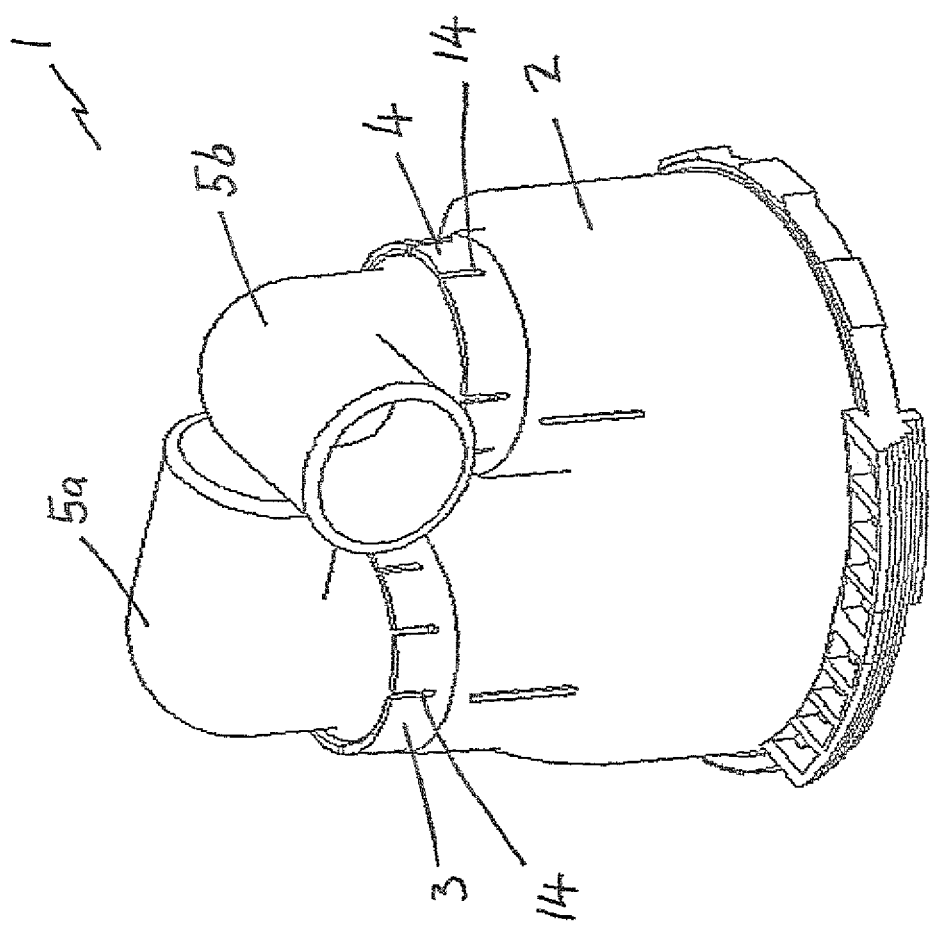
FIG. 3 is a perspective assembled view of a water pump chamber, water inlet port and water outlet port.

FIG. 3 shows that the ports 5a and 5b can be removed one at a time when hoses (not shown) have been disconnected, port 5a being in the port release position.

In use, in order to assemble the water pump 1 an operator press-fits the chimney engaging end 7 of the ports 5a, 5b into the opening defined by the wall 15 of each chimney 3, 4. It is not necessary to align the tongues 9 with openings 18 unless the chimneys 3, 4 are provided without slots 14. The fitted ports 5a, 5b are rotated into their in use position and connected to hoses (not shown) for supply and removal of water to and from the pump 1. With hoses connected to the ports 5a, 5b it is impossible for the ports 5a, 5b to rotate into the port release position as shown in FIG. 3. In order to remove the ports 5a, 5b for cleaning, unblocking or obtaining access to the innards of the pump chamber 2, the hoses must be disconnected to allow the ports 5a, 5b to be rotated into the port release position as shown in FIG. 3 one at a time.

Variations and modifications can be made without departing from the scope of the invention as defined in the appended claims.

I claim:

1. A pump apparatus comprising a pump having a pump chamber with at least one chimney and at last one separable port locatable in the at least one chimney, the at least one separable port having a chimney engaging end, and a quick attach and safe release arrangement for quickly attaching and releasing the chimney engaging end of the at least one separable port to the at least one chimney, the quick attach and safe release arrangement comprising:

(a) a press-fitting arrangement to press fit the chimney engaging end of the at least one separable port into the at least one chimney, and (b) a cooperating retaining means integrally formed with the at least one chimney and integrally formed with the chimney engaging end of the at least one separable port for retaining the at least one separable port for retaining the at least one separable port within the at least one chimney;

wherein the cooperating retaining means and the press-fitting arrangement:

(i) cooperate together during the fitting of the chimney engaging end of the at least one separable port into the at least one chimney, such that the at least one separable port and the at least one chimney are rotatable relative to one another, and (ii) have a single port release position at a predetermined angular position of the at least one separable port relative to the at least one chimney.

2. Apparatus according to claim 1, wherein the cooperating retaining means comprises a flange and at least one tongue.

3. Apparatus according to claim 2, wherein the flange is carried on an internal surface of the at least one chimney.

4. Apparatus according to claim 2, wherein the or each tongue is disposed on an external surface of the at least one separable port.

5. Apparatus according to claim 3, wherein the or each tongue is disposed on an external surface of the at least one separable port.

6. Apparatus according to claim 2, wherein the flange comprises at least one opening to allow the at least one tongue to pass therethrough in the port release position.

7. Apparatus according to claim 3, wherein the flange comprises at least one opening to allow the at least one tongue to pass therethrough in the port release position.

8. Apparatus according to claim 4, wherein the flange comprises at least one opening to allow the at least one tongue to pass therethrough in the port release position.

9. Apparatus according to claim 5, wherein the flange comprises at least one opening to allow the at least one tongue to pass therethrough in the port release position.

10. Apparatus according to claim 1 wherein the or each chimney comprises a chimney wall with at least one longitudinal slot extending through a free edge of the chimney wall and at least partially along the chimney wall.

11. Apparatus according to claim 2, wherein the or each chimney comprises a chimney wall with at least one longitudinal slot extending through a free edge of the chimney wall and at least partially along the chimney wall.

12. Apparatus according to claim 3, wherein the or each chimney comprises a chimney wall with at least one longitudinal slot extending through a free edge of the chimney wall and at least partially along the chimney wall.

13. Apparatus according to claim 4, wherein the or each chimney comprises a chimney wall with at least one longitudinal slot extending through a free edge of the chimney wall and at least partially along the chimney wall.

14. Apparatus according to claim 5, wherein the or each chimney comprises a chimney wall with at least one longitudinal slot extending through a free edge of the chimney wall and at least partially along the chimney wall.

15. Apparatus according to claim 6, wherein the or each chimney comprises a chimney wall with at least one longitudinal slot extending through a free edge of the chimney wall and at least partially along the chimney wall.

16. Apparatus according to claim 7, wherein the or each chimney comprises a chimney wall with at least one longitudinal slot extending through a free edge of the chimney wall and at least partially along the chimney wall.

17. Apparatus according to claim 8, wherein the or each chimney comprises a chimney wall with at least one longitudinal slot extending through a free edge of the chimney wall and at least partially along the chimney wall.

18. Apparatus according to claim 9, wherein the or each chimney comprises a chimney wall with at least one longitudinal slot extending through a free edge of the chimney wall and at least partially along the chimney wall.

19. Apparatus according to claim 10, wherein the or each chimney wall comprises a plurality of longitudinal slots.

20. Apparatus according to claim 19, wherein the plurality of longitudinal slots divide the or each chimney wall of the or each chimney into a plurality of teeth.

21. Apparatus according to claim 20, wherein the flange is disposed on an internal surface of the teeth at or about the free ends of the teeth.

22. Apparatus according to claim 4, wherein two tongues are disposed on the at least one separable port at non-diametrically opposed locations.

23. Apparatus according to claim 22, wherein the flange has to non-diametrically opposed openings which align with the two non-diametrically opposed tongues in the port release position.

24. Apparatus according to claim 1, wherein the cooperating retaining means is provided by an arrangement having a tongue and a groove.

25. Apparatus according to claim 1, wherein the pump chamber comprises a pair of chimneys and an inlet port and an outlet port locatable in the pair of chimneys, the cooperating retaining means being integrally formed on both chimneys and on both the inlet port and the outlet port.

26. Apparatus according to claim 2, wherein the pump chamber comprises a pair of chimneys and an inlet port and an outlet port locatable in the pair of chimneys, the cooperating retaining means being integrally formed on both chimneys and on both the inlet port and the outlet port.

27. Apparatus according to claim 24, wherein the pump chamber comprises a pair of chimneys and an inlet port and an outlet port locatable in the pair of chimneys, the cooperating retaining means being integrally formed on both chimneys and on both the inlet port and the outlet port.

28. Apparatus according to claim 25, wherein the cooperating retaining means is integrally formed on an internal surface of both chimneys and on an external surface of both the inlet port and the outlet port.

29. Apparatus according to claim 26, wherein the cooperating retaining means is integrally formed on an internal surface of both chimneys and on an external surface of both the inlet port and the outlet port.

30. Apparatus according to claim 27, wherein the cooperating retaining means is integrally formed on an internal surface of both chimneys and on an external surface of both the inlet port and the outlet port.

31. Apparatus according to claim 1, wherein the pump is a water pump.

32. The apparatus according to claim 1, wherein the at least one separable port can be positioned at any angular displacement relative to the at least one chimney during press-fitting of the at least one separable port together with the at least one chimney of the pump chamber when the chimney engaging end has been co-axially aligned with the chimney.

* * * * *